Figure 1:
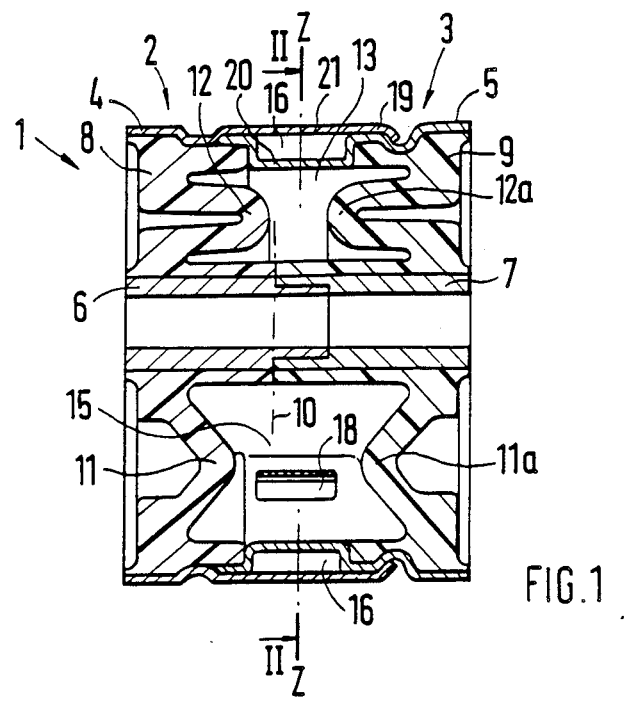

United States Patent [19]

von Broock

[11] Patent Number: 4,705,410
[45] Date of Patent: Nov. 10, 1987

[54] HYDRAULICALLY DAMPING BEARING

[75] Inventor: Ulrich von Broock, Weissach, Fed. Rep. of Germany

[73] Assignee: Dr. Ing. h.c.F. Porsche Aktiengesellschaft, Stuttgart, Fed. Rep. of Germany

[21] Appl. No.: 902,699

[22] Filed: Sep. 2, 1986

[30] Foreign Application Priority Data

Aug. 31, 1985 [DE] Fed. Rep. of Germany ....... 3531182

[51] Int. Cl.$^4$ .............................. F16F 9/10; F16F 1/38
[52] U.S. Cl. ..................................... 384/99; 384/222;
267/140.1; 267/141.2; 267/219;
267/292
[58] Field of Search .................. 384/99, 202, 215, 220,
384/222, 37, 38; 267/57.1 R, 57.1 A, 63 R, 63
A, 35, 141, 140.1, 153, 141.1, 141.2; 403/225,
228; 280/673, 716, 702, 709

[56] References Cited

U.S. PATENT DOCUMENTS

| | | | |
|---|---|---|---|
| 3,147,964 | 9/1964 | Wolf | 267/57.1 A |
| 3,642,268 | 2/1972 | Hipsher | 267/57.1 R |
| 4,032,202 | 6/1977 | Ishikawa et al. | 384/220 |
| 4,121,813 | 10/1978 | Inuzuka | 267/57.1 A |
| 4,377,216 | 3/1983 | Veno | 267/63 R X |
| 4,588,174 | 5/1986 | Konishi | 267/57.1 A X |
| 4,605,207 | 8/1986 | Konishi | 267/57.1 R |
| 4,630,806 | 12/1986 | Dan et al. | 267/140.1 |

Primary Examiner—Stuart S. Levy
Assistant Examiner—David Werner
Attorney, Agent, or Firm—Barnes & Thornburg

[57] ABSTRACT

A hydraulically damping bearing which includes an inner bushing arranged in an outer bushing and an elastic element inserted therebetween. Chambers are provided within the elastic element which are filled with a damping medium and are connected with each other hydraulically by way of throttling channels extending in the area of the outer bushing. The throttling channels terminate in the chambers which, like the throttling channels, are sealed off against the outside. The bearing consists of two bearing halves adapted to be axially inserted into one another which include elastic bellows halves connected with the outer and inner bushing. The bellows halves include mutually opposite annular beads projecting into the interior of the chamber, between which is arranged an enclosed overflow channel.

10 Claims, 2 Drawing Figures

HYDRAULICALLY DAMPING BEARING

The present invention relates to a hydraulically damping bearing, and more particularly to a hydraulically damping bearing which includes an inner sleeve arranged in an outer sleeve and an elastic element inserted therebetween in which on or several chambers are provided filled with a damping medium and hydraulically connected with each other by throttling channels.

Hydraulically damping bearings are disclosed in the German Pat. No. 28 41 505 in which throttling channels are provided for the hydraulic connection of chambers. These channels consist of grooves provided between an outer bushing and an intermediate bushing arranged at a small distance with respect thereto. Several radially extending elastic walls extend between a centrally arranged inner bushing of the bearing and the intermediate bushing which enclose chambers extending in the axial direction. A fluid-tight axial end closure takes place by way of end-face seals which are provided in the course of the manufacturing process in the form of cast-on parts or by sealing disks to be attached subsequently.

As a result of the fluid chambers which during rotary oscillations are alternately reduced and enlarged, the medium is pumped to and fro by way of the throttling channels whereby a predetermined flow resistance having a predetermined damping characteristic is to be achieved.

The present invention is concerned with the task to provide a hydraulically damping bearing which can be manufactured in a simple manner, which has an integrated end-face fluid-tight closure and which assures during operation an assisted medium flow between the chambers.

The underlying problems are solved according to the present invention in that the bearing consists of two plug-in bearing halves adapted to be axially connected one within the other, which include elastic bellows halves connected with the outer and inner bushing that include mutually opposite annular beads projecting into the interior of the chamber, between which is arranged an enclosed overflow channel.

A bearing is created by the present invention which by its two-partite construction includes a tight end-face closure and thereby may include an inwardly directed V-shaped annular bead that also in case of loads exhibits no buckling or bulging toward the outside. The thus-constructed annular bead forms in the hollow space of the bellows together with the outer bushings a chamber with an X-shaped cross section which, depending on the deformation in case of load, changes to an H-shaped cross section. The bead is preferably constructed relatively thin-walled in order that during operation a folding-together and a pumping action resulting therefrom can take place so that a larger volume can be pumped to and fro between the chambers.

In contrast to the German Pat. No. 28 41 505, the throttling channel is formed between two outer bushings of the bearing halves whereby the latter are partly plugged together one within the other and the inwardly disposed bushing has a circumferential formed-out portion in the overlapped area which forms the channel, properly speaking. A tight connection of the bushings among one another takes place by way of grooves, pressed-out portions, adhesive bonding or other connections which achieve a sealing tightness.

Figure 2:
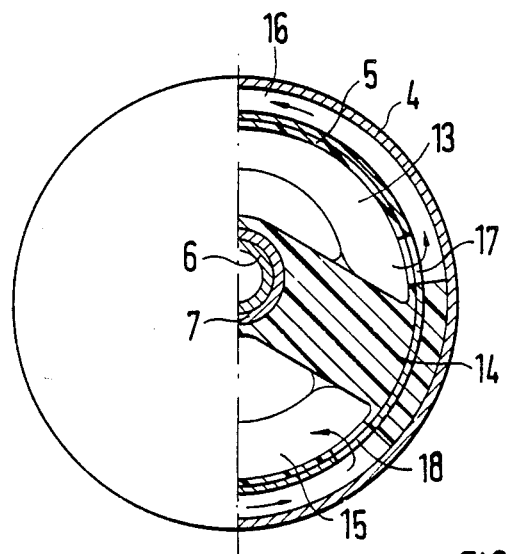

These and other objects, features and advantages of the present invention will become more apparent from the following description when taken in connection with the accompanying drawing which shows, for purposes of illustration only, one embodiment in accordance with the present invention, and wherein:

FIG. 1 is a longitudinal cross-sectional view through a bearing in accordance with the present invention; and FIG. 2 is a cross-sectional view, taken along line II—II of FIG. 1.

Referring now to the drawing wherein like reference numerals are used throughout the two views to designate like parts, the bearing generally designated by reference numeral 1 essentially includes two bearing halves generally designated by reference numerals 2 and 3 with one outer bushing 4 and 5 each and an inner bushing 6 and 7 each. Elastic elements with bellows sections 8 and 9 are provided between these bushings 4, 6 and 5, 7 which are connected with the bushings by vulcanizing and are joined in the separating plane 10.

Each bellows section 8 and 9 includes mutually opposite annular beads 11, 11a and 12, 12a. Mutually elastically separated reniform chambers 13 and 15 are formed by walls 14 between these annular beads and, on the one hand, limited by the bushings 6 and 7, respectively, by an elastic covering layer of the bearing and, on the other, by the outer bushing 5. These chambers 13 and 15 are connected with each other by a throttling channel 16 which is as long as possible, whereby the openings 17 and 18 are then arranged correspondingly in the chambers 13 and 15. The length of the channel 16 is varied by the position of the openings 17 and 18 and therewith the flow resistance and a damping characteristic resulting therefrom is matched. The illustrated position of the opening is to be regarded as an example; however, the openings may also have a different position relative to the chambers.

The annular bead 11, 11a and 12, 12a is constructed V-shaped in cross section and consists of a relatively thin wall which is adapted to be folded during radial loads of the bearing (FIG. 1—in which the upper half shows the position of the annular bead under load). This folding ability effects a so-called "pumping action" which is produced in addition to the medium exchange caused by the reduction of the chambers.

The throttling channel 16 is provided as groove-shaped recess 20 in the outer bushing 5 of the bearing half 3 and is closed off at the top by a wall part 21 of the further outer bushing 4 of the bearing half 2 so that an enclosed channel 16 results which extends coaxially to the inner bushings 6 and 7. In particular, the outer bushing 4 has an overlapping 19 that includes a wall part 21. The channel 16 is preferably arranged in a center plane Z—Z of the bearing 1 which at the same time represents the connecting plane of the bearing halves 2 and 3.

The manufacture of the bearing 1 takes place in the manner that the bearing halves 2 and 3 are cast in a mold whereby the bushings are connected with each other at the same time. As a result of the two-partite manufacture of the bearing, a V-shaped cross-sectional construction of the bead becomes possible. The connecton of the two bearing halves 2 and 3 takes place by plugging the inner and outer bushings into one another and by connecting the two outer bushings 5 and 6. A separate axial sealing closure is not required because the elastic element is connected with the inner and outer bushing already during the manufacturing process.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A hydraulically damping bearing comprising:
   outer bushing means;
   inner bushing means concentrically interior the outer bushing means;
   elastic means between said outer and inner bushing means;
   two sealed chamber means within said elastic means and filled with a damping medium;
   a sealed throttling channel means adjacent said outer bushing means and terminating in said two chamber means for hydraulically connecting said two chamber means;
   the bearing consisting of two axial bearing halves axially inserted one within the other;
   said elastic means including elastic bellow halves connected with the outer and inner bushing means and having mutually opposite annular beads projecting into the interior of the chamber means;
   said throttling channel means including an enclosed overflow channel between said elastic bellow halves.

2. A bearing according to claim 1, wherein the annular bead projecting into each chamber means is substantially V-shaped in cross section and is foldable inside of the chamber means for achieving an alternate pumping action between the two chamber means.

3. A bearing according to claim 2, wherein the throttling channel means has a relatively great length than the two chamber means and extends from a starting area of the one chamber means to an end area of the other chamber means adjacent said starting area of said one chamber means, and said two chamber means being connected with each other by way of openings terminating approximately in an axial center plane of the bearing.

4. A bearing according to claim 3, wherein the outer bushing means consists of two axial outer bushings of the bearing halves axially inserted one within the other to form the enclosed throttling channel means and includes each an overlap projecting beyond the center plane.

5. A bearing according to claim 4, wherein the enclosed throttling channel means is formed by a channel-shaped recess in the outer bushing means disposed partially inwardly and by a covering wall section of the other outer bushing means.

6. A bearing according to claim 5, wherein the throttling channel means is arranged approximately in the center plane of the bearing.

7. A bearing according to claim 1, wherein the throttling channel means has a relatively great length than the two chamber means and extends from a starting area of the one chamber means to an end area of the other chamber means adjacent said starting area of said one chamber means, and said two chamber means being connected with each other by way of openings terminating approximately in an axial center plane of the bearing.

8. A bearing according to claim 1, wherein the outer bushing means consists of two axial outer bushings of the bearing halves axially inserted one within the other to form the enclosed throttling channel means and includes each an overlap projecting beyond an axial center plane of the bearing.

9. A bearing according to claim 8, wherein the enclosed throttling channel means is formed by a channel-shaped recess in the outer bushing means disposed partially inwardly and by a covering wall section of the other outer bushing means.

10. A bearing according to claim 1, wherein the throttling channel means is arranged approximately in an axial center plane of the bearing.

* * * * *